April 20, 1937.　　　D. S. BRUCE　　　2,077,669
FRICTION MATERIAL AND METHOD OF MAKING THE SAME
Filed June 1, 1934
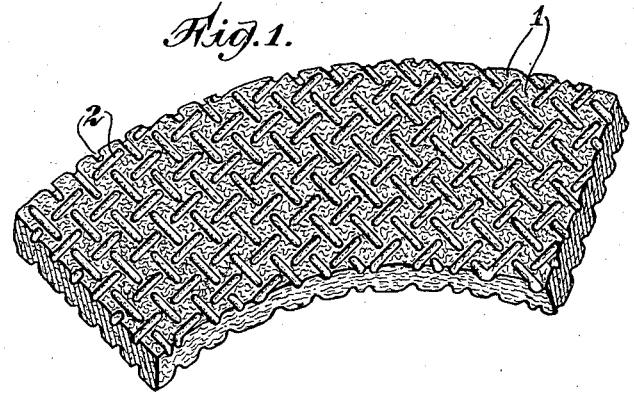
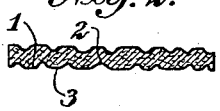 
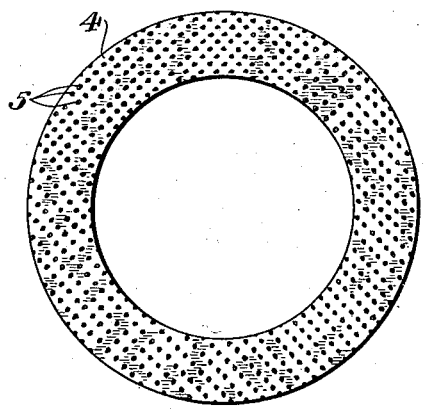
INVENTOR.
Donald S. Bruce.
BY
ATTORNEY.

Patented Apr. 20, 1937

2,077,669

UNITED STATES PATENT OFFICE 2,077,669

FRICTION MATERIAL AND METHOD OF MAKING THE SAME

Donald S. Bruce, Somerville, N. J., assignor to Johns-Manville Corporation, New York, N. Y., a corporation of New York Application June 1, 1934, Serial No. 728,479

9 Claims. (Cl. 91—70)

This invention relates to a friction material and the method of making the same, and particularly to a friction material comprising a continuous substantially rigid base and a yieldable friction compound disposed thereover and integrally united thereto.

In the provision of friction material for use in packing moving surfaces, as in automotive brake lining or the like, there has been difficulty in obtaining, in one material, an article that is in all respects satisfactory.

Thus, brake linings containing woven asbestos yarn and friction compound associated therewith are not entirely satisfactory in mechanical strength, adaptability to being machined within close limits, in holding rivets inserted therethrough in conventional brake assemblies, or in thermal conductance. Furthermore, these linings may fail under high centrifugal loading such as experienced in the use of the material as clutch facing. Also, there may develop fuzz when the surface is ground or subjected to long continued use. Finally, such lining may be permeable to water.

On the other hand, conventional friction material of the type of asbestos millboard impregnated with a phenol-aldehyde condensation product, with a hardened drying oil, or the like, have an undesirably high rate of abrasion or wearing.

It is an object of this invention to provide a friction material that obviates the undesirable features of the millboard and the woven fabric types, that is, to provide a brake lining that is shape-retaining, may be machined within close tolerances, has good strength, does not give a fuzzy surface when machined, is wear-resistant, and has thermal conductance adequate to conduct away, at a satisfactory rate, the heat developed during the use of the friction material. Another object is the provision of a friction material containing friction compound in very high proportion in certain areas. Other objects and advantages will appear from the detailed description that follows.

In one embodiment, the invention comprises the method of and the product resulting from forming a continuous base of the type of asbestos millboard, impregnating thereinto a heat-resistant, strengthening material of the type of a phenol-aldehyde condensation product, disposing thereover a composition of the type of a rubber friction compound, and hardening the said material and composition. In the preferred embodiment, the impregnated base material has irregularities of surface including upstanding projections and intervening depressions constituting reservoirs, into which reservoirs and over which projections the friction compound is applied. Preferably, the face of the finished article contains exposed alternating areas of a yieldable (resilient) wear-resisting friction compound and impregnated base material of the type described.

A preferred embodiment of the invention is illustrated in the drawing forming a part of this specification, in which Fig. 1 shows a sectional perspective view of the base material;

Fig. 2 shows a cross sectional view of the base illustrated in Fig. 1, with a layer of adhesive material disposed over the face and back thereof;

Fig. 3 shows a cross sectional view, similar to that of Fig. 2, of the article after the application over its surface of a thick layer of friction compound; and Fig. 4 shows a face view of a finished article made according to the invention and of annular shape adapted for use as the clutch facing of an automobile.

The invention will be described particularly in connection with the drawing and illustrated by the example of clutch facing, although it is to be understood that the material may be made into a band or other shape for use as a brake lining, packing, bushing, or other friction material.

In the various figures like reference characters denote like parts.

The base material illustrated in Fig. 1 is suitably unwoven and of the type of felted asbestos fibres forming a continuous sheet, such, for example, as an asbestos millboard or heavy paper. The millboard, for instance, may be made in conventional manner but, preferably, with minimized compression of the felted material, to preserve the looseness of the felting, and then subjected to compression between embossing dies, coarsely woven metal screens, or other suitable members, to provide desired irregularities of surface. In the form illustrated, the irregularities of surface take the form of upstanding projections 1 and intervening depressions or deep indentations 2 forming reservoirs of substantial capacity adapted to receive friction compound, as will be described later.

The millboard or other continuous base is now subjected to impregnation by a composition adapted to be hardened and to provide, adequate strengthening, thermal conductance, and desired friction characteristics, including the property of withstanding temperatures that may prevail during use of the article. There may be used as the impregnating material a composition including a resinous product of the type of a phenol-aldehyde condensation product and/or a drying oil, as, for example, Chinawood or linseed oil. In case a phenol-aldehyde condensation product is selected, it is used suitably in the so-called "A-stage" which is adapted to be hardened subsequent to impregnation into the base. The oil, if used, is impregnated preferably in non-polymerized or unoxidized state. In any case, the impregnating composition may be introduced in solution in a volatile solvent therefor and/or under compression. Preferably, the impregnating compound is introduced in fluid form, in the presence of little or no solvent, in order to increase the proportion of non-volatile material impregnated. Subsequent to the impregnation, the impregnating compound is hardened in situ, as by being subjected to an elevated temperature and, if desired, to an elevated pressure, in accordance with the known practice for hardening the particular compound used for the impregnation.

The impregnation and subsequent treatment of the base material should be made in such manner as to preserve the irregularities of surface of the base throughout the impregnation and hardening and to close pores in the unwoven base material.

To the base having the said irregularities of surface and containing the impregnated and hardened composition there may be applied a continuous layer 3 of cement or adhesive material, say, of composition similar to or the same as that previously impregnated into the base. It is desirable, however, that the cementing material should be partly modified to the hardened condition before application. Thus, if a phenol-aldehyde product is used as the adhesive, it may be applied in so-called "B-stage". The material may be applied in a solution in a volatile solvent which is subsequently evaporated.

To the impregnated base material, preferably with the said layer of cementing material present, there is applied a superficial layer of substantial thickness of a composition 4 of the type of rubber friction compound. Thus, there may be used a compound comprising rubber, filler, vulcanization materials, and/or other ingredients that are conventional in friction compounds. Also, there may be used a composition, of the type of a rubber friction compound, comprising a large proportion of polymerized chloroprene, say of the quality now widely known as "Duprene", with compounding ingredients that are conventional for use therewith. The friction compound, as initially applied, is disposed over the projections and fills the reservoirs as illustrated in Fig. 3.

Finally, this friction compound is hardened, as by vulcanization of the rubber therein or corresponding treatment adapted to harden other friction compound that may have been used, suitably under compression in dies to establish smoothness of surface or the shape desired and to cause thorough contacting and welding together of the impregnated and the overlaid friction compounds or of these compounds and the intervening layer of cementing material 3, if the latter has been used.

Especially good results have been obtained when the cementing layer 3 is present and is of the type of a phenol-aldehyde condensation product of which a common representative is the material known commercially as "bakelite".

The article appearing in cross section, as illustrated in Fig. 3, may be made into the shape of a disc, as illustrated in Fig. 4, for use as clutch facing.

Regardless of the particular shape of the article made, the wearing surface thereof may be formed by grinding or otherwise treating a face, to remove the relatively thin coating of friction compound over the tops of the upstanding projections 1 and, thereby, to provide a face or wearing surface having exposed alternating areas of friction compound 4 and base material 5.

The compound 4 is wear-resisting. Although yieldable, it is maintained in position by the intervening substantially rigid projections 2 of the base material. Since the projections on the base material contact at closely spaced intervals with the surface to which the friction material is applied, during use, the projections serve to conduct away heat generated by the friction and, thereby to minimize the danger of overheating the friction compound 4.

In making a product of the type described, the following procedure has been followed in a typical instance: There was made an asbestos millboard on a so-called wetboard machine, under as little compression as would suffice to give a soft, self-sustaining sheet of thickness 0.21 to 0.23 inch. The product, in damp condition and before the interior thereof was allowed to become dry, was compressed for a few seconds at a pressure of approximately 2,000 pounds to the square inch, against a piece of 4-mesh galvanized iron screen applied to one face, to give a sheet having an indented and an unindented side. The thus compressed material had a maximum thickness of 0.19 to 0.20 inch. The indented product was then dried at about 150° F. and cut into rings for subsequently being made into clutch facing.

The rings were then impregnated with a viscous fluid composition including an A-stage phenol-aldehyde resin under pressure, drained for 24 hours, and baked, first, at moderately elevated temperatures and then for 9 hours at 300 to 350° F. The resulting material contained 24 parts of impregnated compound to 100 parts of total weight.

The impregnated rings were then ground to reduce the maximum thickness to 0.140 inch, all the material removed coming from the unindented side of the article. The ground rings were then baked at 400° F., for 6 hours, under slight compression between plane surfaces. The indents remaining averaged about 0.08 inch in depth.

The baked rings were then impregnated for 5 minutes, at room temperature, with a 50 percent solution of B-stage phenol-aldehyde resin in alcohol. The product was then dried at room temperature for several hours.

To the indented surface or face of the rings there was then applied a preformed sheet of plastic rubber friction compound, 0.05 inch thick. The sheet and the ring were pressed together and cured for 15 minutes under 125 pounds pressure of steam, between plates of plane surface.

The thus baked rings were further cured between plates of plane surface under very slight compression at 300° F., for a period of 1 hour.

The resulting rings were then surface ground on both faces, to give a finished article of thickness of 0.122 to 0.128 inch.

Illustrative of the surprising results obtained from the structure described, as compared to a standard friction material, are the data on abrasion or rate of wear for typical specimens of the two kinds. With the use of standard testing methods, the following comparable results have been obtained:

*Rates of wear*

| Temperature of test, degrees F. | Rates of wear, cubic inches, per horse power, per hour | |
|---|---|---|
| | Conventional impregnated asbestos millboard | Product of present invention |
| 160 | 0.004 | 0.0008 |
| 350 | 0.012 | 0.004 |

The details that have been given are for the purpose of illustration, not restriction, and variations therefrom may be made within the scope of the appended claims.

What I claim is:

1. A friction material comprising a continuous base of felted fibres, a friction compound impregnated thereinto and adapted to strengthen and harden the base and to withstand temperatures prevailing during use of the material, upwardly projecting portions of the surface of the impregnated base material, intervening depressions therein constituting reservoirs, and a friction compound disposed over the said surface and filling the reservoirs.

2. A friction material comprising a continuous base of asbestos millboard, a friction compound impregnated thereinto and adapted to strengthen and harden the base and to withstand temperatures prevailing during use of the material, upwardly projecting portions of the surface of the impregnated base material, intervening depressions therein constituting reservoirs, and a friction compound disposed over the said surface, filling the reservoirs, and being in condition of having been hardened in situ and integrally united to the compound impregnated into the base.

3. A friction material comprising a continuous base of felted fibres, a friction compound impregnated thereinto and adapted to strengthen and harden the base and to withstand temperatures prevailing during use of the material, upwardly projecting portions of the surface of the impregnated base material, intervening depressions therein constituting reservoirs, a layer of heat-resistant adhesive material disposed over the said surface of the impregnated base material and integrally united thereto, and a friction compound disposed over and integrally united to the said adhesive material.

4. A friction material comprising a continuous base of asbestos millboard, a friction compound including a resinous phenol-aldehyde condensation product impregnated into the base, upwardly projecting portions of the surface of the impregnated base material, intervening depressions constituting reservoirs, a layer of adhesive material including a resinous phenol-aldehyde condensation product disposed continuously over the said surface of the impregnated base, and a friction compound of greater wear-resistance than the impregnated compound and adhesive material disposed over the said adhesive material, the adhesive material and the said friction compounds being in the condition of having been hardened in situ.

5. A friction material comprising a continuous base having intervening depressions therein constituting reservoirs and including felted asbestos fibres and a resinous phenol-aldehyde condensation product impregnated thereinto and a friction compound of greater wear-resistance than the said product disposed over the said base, the phenol-aldehyde product and the said compound being exposed in alternating areas on the wearing surface of the material.

6. The method of making a friction material which comprises indenting asbestos millboard, impregnating thereinto a hardenable friction compound, hardening the impregnated compound while preserving the irregularity of surface of the millboard, applying a heat-hardenable friction compound to the surface of the base material containing the hardened impregnated compound, and then subjecting the resulting article to an elevated temperature and pressure to harden the said heat-hardenable compound and unite it integrally to the compound impregnated into the base.

7. The method of making a friction material which comprises indenting asbestos millboard, impregnating thereinto a resinous phenol-aldehyde condensation product, hardening the said product while preserving the irregularity of surface of the millboard, coating thereover a layer of adhesive material including a resinous phenol-aldehyde condensation product, subjecting the resulting article to an elevated temperature to harden the said adhesive material, applying a heat-hardenable friction compound over the hardened adhesive material, and then subjecting the resulting article to an elevated temperature and pressure to harden the friction compound and unite it integrally to the said adhesive material.

8. The method of making a friction material which comprises indenting asbestos millboard, impregnating thereinto a resinous phenol-aldehyde condensation product, hardening the said product while preserving the irregularity of surface of the millboard, coating thereover a layer of adhesive material including a resinous phenol-aldehyde condensation product, applying a heat-hardenable friction compound over the adhesive material, and then subjecting the resulting article to an elevated temperature and pressure to harden the friction compound and the said adhesive material.

9. A friction material comprising a continuous base of felted fibres, a friction compound impregnated thereinto, strengthening and hardening the base and being adapted to withstand temperatures prevailing during use of the material, upwardly projecting portions of the surface of the impregnated base material, intervening depressions therein constituting reservoirs, a layer of heat-resistant adhesive material disposed over the said surface of the impregnated base material and integrally secured thereto, and a friction composition disposed over the adhesive and integrally adhered thereto, the said adhesive and friction composition substantially filling the said reservoirs and the said composition and said upwardly projecting portions being exposed in alternating areas on the wearing surface of the friction material.

DONALD S. BRUCE.